Reissued Dec. 23, 1947

Re. 22,951

UNITED STATES PATENT OFFICE 22,951

PROCESS OF MAKING ALKALI SUBSILICATES

Richard Lloyd Davies, Newtown Square, Pa., assignor to Pennsylvania Salt Manufacturing Company, Philadelphia, Pa., a corporation of Pennsylvania No Drawing. Original No. 2,100,944, dated November 30, 1937, Serial No. 99,309, filed September 3, 1936. Application for reissue filed May 13, 1946, Serial No. 669,209

21 Claims. (Cl. 23—110)

My invention relates to a novel process of manufacturing soluble alkali silicates and more particularly it relates to an economic process for the production of alkali sub-silicates with an alkali content not less than the silica content by the direct reaction of molten caustic alkali and silica-containing material.

One object of the present invention is to provide a method by which soluble alkali silicates may be easily and economically manufactured without resort to the expensive equipment and laborious steps required in either the wet digestion or the furnace process previously employed in the production of these compounds.

A further object of the invention is to furnish a process of making alkali sub-silicates by the reaction between molten caustic soda and solid reactive silica-containing material in contradistinction to the previous processes where the reactions are carried out either in solution or by fusion in a furnace.

Still another object is to provide a process by which granular or pulverulent soluble alkali silicates may be obtained in one step at small expense for labor and with a small capital investment.

Still another object is to provide a process for the manufacture of high grade, free-flowing stable alkali silicates of low hydration and of variable ratios of $Na_2O$ to $SiO_2$; for example, it is possible by this new method to manufacture the sesquisilicate with a ratio of alkali to silica ($Na_2O$ to $SiO_2$) of 1.5 to 1 and increase this through the 2 to 1 ratio of the orthosilicate. The substantially anhydrous materials obtained by the process of the present invention may be contrasted with the variety of silicates now available on the market and which contain large and varying percentages of water of crystallization.

Other objects will be apparent from a consideration of the specification and claims.

The processes heretofore employed in the production of alkali silicates whose $Na_2O$ content is not less than the silica content, known and referred to herein as alkali sub-silicates, have been time consuming, laborious, and expensive and have required a comparatively heavy plant investment. As indicated above, the sub-silicates have previously been manufactured by fusion methods, or by wet digestion methods or a combination of the two. In the fusion method, an alkali carbonate and silica are heated together to a high temperature substantially above the fusion point of the system, and the fused product after solidifying is dissolved in water and corrected to the proper alkali-silicate ratio. It is then necessary to concentrate the solution, remove the silicates therefrom by crystallization, drying and comminuting the crystals. In such a process, the plant and equipment are costly, the repair charges are high due to the slagging effect on the furnace linings, and the fuel consumption is high. In the wet digestion method, a solution of water glass, or finely divided silica rendered soluble by digestion with a concentrated solution of caustic alkali, is evaporated and cooled to a suitable crystallization temperature. It is then seeded, agitated, and cooled to remove therefrom the heat generated by the crystallization. The crystals are removed, dried, and comminuted. When water glass is employed it is obtained by fusing silica with an alkaline carbonate or an alkali sulphate and carbon, followed by a special extraction process to render the silicate soluble. It is obvious that in these digestion processes the evaporation costs are high, a comparatively large plant is required, and the necessary digester equipment is expensive.

The process of the present invention is a marked departure from the previous processes, since neither crystallizing tanks nor digesting apparatus is necessary. In accordance with the provisions of the present invention, the manufacture of these sub-silicates is advantageously undertaken in connection with the manufacture of caustic soda or caustic potash, and the molten caustic alkali from a caustic pot may be charged into a mixing device and the solid, reactive silica-containing material added gradually with careful stirring. The length of time of the reaction and the time required to produce the granular product will obviously depend on the temperature of the caustic soda reacted. Preferably, caustic soda of 100% purity is used at or above its melting point, in which case the reaction is a violent one and is practically instantaneous. The reaction is complete in one minute after the addition of the last of the silica-containing material and in fifteen to twenty minutes a free-flowing granular material is discharged from the mixer. Thus in a one-step process and with a small investment, it is possible to produce an excellent grade of a sub-silicate of soda and to discharge from the mixer, material that goes directly to the consumer without further treatment. The material is a substantially anhydrous sub-silicate, although it may contain a fraction of 1 molecule of water of crystallization. It will be seen that the process of the present invention largely eliminates the difficulties and expense of both the wet digestion and the furnace methods previously employed in the manufacture of alkali subsilicates. The present process avoids the multiple adjustments and readjustments of composition, hydration, and concentration, as well as the seeding, crystallization, separation of the crystals, and drying required in a wet digestion method. By making use of standard equipment, the process obviates the need of special fusion furnaces of complicated construction, of the high temperature rotating reaction vessels provided with special mechanical agitators and of the special furnace linings required in the fusion process furnace.

The process of the present invention is particularly applicable for the production of alkali sesquisilicate or orthosilicate or mixtures of these materials. If the ratio of $Na_2O$ to $SiO_2$ is 2 to 1, a silicate is formed directly in the mixer which is from 99% to 100% soluble. The ratio of the two oxides in the compound corresponds to the orthosilicate and is technically anhydrous. When the ratio of $Na_2O$ to $SiO_2$ is 1.5 to 1, a compound is formed in the mixer in which the ratio of $Na_2O$ to $SiO_2$ corresponds to the sesquisilicate. If the ratio of $Na_2O$ to $SiO_2$ lies between the 2 to 1 and 1.5 to 1, mixtures of the ortho- and sesquisilicates will be obtained.

The term "solid, reactive, silica-containing material" employed herein includes silica and the solid water glasses where the ratio of $SiO_2$ exceeds that of $Na_2O$, for example the water glasses where the ratio of $Na_2O$ to $SiO_2$ is 1 to 3.32 and 1 to 2. It is to be understood, however, that other solid compounds of $Na_2O$ and $SiO_2$ where the ratio of the latter exceeds the former may be employed. The silica may be of any desired purity and of any suitable fineness to promote the reaction and may be anhydrous or a hydrated silicon dioxide. The silica may be in an amorphous form, such as opal or diatomaceous earth, or the natural crystalline forms such as rock crystal, sand, flint, sandstone or any other variety of quartz can be used. By-product amorphous or crystalline forms of silica hydrated or otherwise are also suitable sources of silica. Since in general a high purity product is desired, a relatively pure silica will be used, but if the purity of the finished silicate is not a requisite, impure silica may be used, provided that the impurities do not react at the temperature and under the conditions of the reaction to form insoluble silicates.

The term "molten caustic soda" refers to the caustic soda which while molten at elevated temperatures is solid at ordinary temperatures. Caustic soda of 100% purity may be used, as well as molten caustic soda containing water, for example as much as approximately 15% water. Preferably, as previously stated, the molten caustic soda will possess sufficient sensible heat, as in the case when molten 100% caustic soda is used at or above its melting point, to produce a technically anhydrous product directly in the mixing device. The reaction between the caustic soda and the solid silica-containing material may take place at any temperature between the melting point of the caustic soda (about 318° C. for 100% caustic soda) and the melting point of the reaction product. When molten caustic soda of less than 100% NaOH is employed, the temperature and concentration thereof will determine the reaction and granulation time, and the degree of hydration of the product obtained from the mixing device. The higher the temperature and the concentration of the molten caustic soda, the more closely will the product approach the technically anhydrous sub-silicate, since water associated with the caustic soda is driven off by the combined effect of the sensible heat and of the heat of the reaction along with chemically combined water displaced from the caustic soda. As previously indicated, the process of the present invention is advantageously carried out in connection with the manufacture of caustic soda, since the caustic pots provide the most economical source of molten caustic soda. In the preferred process, the molten caustic soda and solid reactive silica-containing material are mixed immediately after the removal of the desired amount of water from the caustic soda, at which point the temperature of the caustic soda is sufficiently high to cause an immediate reaction. Preferably the reaction is carried out at temperatures between approximately 300° C. and approximately 500° C.

In a typical case, and to prepare sequisilicate of soda, 60 parts of silica are added gradually to a revolving mixer which contains 123 parts of molten caustic soda at a temperature of about 400° C., the reaction is complete in about four minutes, the mass becomes plastic during a further thirteen minutes and starts to crumble, and is discharged in a further three minutes as a free-flowing, technically anhydrous, granular material ready for the market. To prepare the orthosilicate, 60 parts of silica are added gradually to a mixer which contains 165 parts of molten caustic soda under similar conditions to the previous example, within one minute of the addition of all of the silica the reaction is complete and in less than a total time of twenty minutes a substantially anhydrous free-flowing powder is discharged from the mixer, the material being ready for the market. Also, it is sometimes desirable in connection with this process to incorporate with the silicates other materials possessing somewhat similar properties, for example trisodium phosphate, disodium phosphate, sodium carbonate, and sodium bicarbonate. Such a mixture may be employed, for example, where water-softening properties are desired.

In the foregoing examples, silica has been employed as the solid, reactive, silica-containing material, but as stated the solid water glasses may be used in place of silica to form the same products, and in this case the ratio of $SiO_2$ to $Na_2O$ in the water glasses is figured in determining the amount of caustic soda to be added to form the sub-silicate desired.

To prepare the sesquisilicate using solid water glass, the following example may be given: 100 parts of water glass having a ratio of $Na_2O$ to $SiO_2$ of 1 to 3.32 are gradually added with stirring to 120 parts of molten caustic soda, the reaction being complete in about two minutes. In six minutes, a free-flowing product is discharged from the mixer in powder form, more than 94% of which is soluble in water.

To prepare the orthosilicate from a similar grade of water glass and molten caustic soda, 100 parts of the water glass are added gradually with stirring to 170 parts of molten caustic soda, the reaction is complete in less than two minutes, and in five and three-quarter minutes a dry powdery material is discharged from the mixer, over 98% of which is soluble in water.

To prepare the sesquisilicate from another type of water glass, for example one having a ratio of $Na_2O$ to $SiO_2$ of 1 to 2, the following materials are charged into the mixer: 91 parts of water glass and 84¼ parts of molten caustic soda. The reaction is complete in less than a minute, an excellent free-flowing product being discharged from the mixer in about five minutes.

The orthosilicate of soda is prepared from this second type of water glass by mixing 91 parts of water glass with 126¼ parts of molten caustic soda, the reaction is complete in less than a minute and a granular product in powder form is produced in about five minutes.

In the foregoing examples, the molten caustic soda employed was approximately 100% caustic soda, and it is to be understood that if molten caustic soda containing some water is used, the weight of caustic soda added will be increased accordingly.

Considerable modification is possible in the proportions of reactive silica material and water glass employed, also the temperature of the molten caustic can be varied without departing from the essential features of the invention.

I claim:

1. The process of preparing a solid, alkali subsilicate product which comprises adding molten caustic alkali, containing not more than approximately 15% water, and a solid, sub-divided, silica-containing material selected from the group consisting of silica and alkali metal silicate having a molecular ratio of $SiO_2$ to alkali oxide greater than 1 to 1, to a reaction vessel, the reactants being present in such molecular proportions that the alkali oxide content exceeds the silicon dioxide content and is not greater than approximately 2 to 1; reacting the mixture while stirring it at a temperature above approximately 300° C. and above the melting point of the caustic alkali employed and below approximately 500° C. and converting the reaction mass into the solidified alkali subsilicate product by the progression of the mass as a whole through a transient plastic state, resulting primarily from the reaction, to the solid state.

2. The process of claim 1 wherein a sodium subsilicate product is formed by the reaction of molten caustic soda, containing not more than approximately 15% water, and a solid, subdivided, silica-containing material selected from the group consisting of silica and a sodium silicate having a molecular ratio of $SiO_2$ to $Na_2O$ greater than 1 to 1.

3. The process of preparing a solid, technically anhydrous, alkali sub-silicate product which comprises adding molten caustic alkali, containing not more than approximately 15% water, and a solid, sub-divided, silica-containing material selected from the group consisting of silica and alkali metal silicate having a molecular ratio of $SiO_2$ to alkali oxide greater than 1 to 1, to a reaction vessel, the reactants being present in such molecular proportions that the alkali oxide content exceeds the silicon dioxide content and is not greater than approximately 2 to 1, reacting the mixture while stirring it at a temperature above approximately 300° C. and above the melting point of the caustic alkali employed and below approximately 500° C. sufficient to free the mixture substantially of water; and converting the reaction mass into the solidified alkali subsilicate product by the progression of the mass as a whole through a transient plastic state, resulting primarily from the reaction, to the solid state.

4. The process of claim 3 wherein a sodium sub-silicate product is formed by the reaction of approximately 100% molten caustic soda, and a solid, sub-divided silica-containing material selected from the group consisting of silica and a sodium silicate having a molecular ratio of $SiO_2$ to $Na_2O$ greater than 1 to 1.

5. The process of preparing a solid, sodium sub-silicate product which comprises adding approximately 100% molten caustic soda, and solid, sub-divided silica to a reaction vessel, the reactants being present in such molecular proportions that the $Na_2O$ content exceeds the $SiO_2$ content and is not greater than approximately 2 to 1; reacting the mixture while stirring it at a temperature above the melting point of the caustic soda employed and below approximately 500° C. and converting the reaction mass into the solidified sodium silicate product by the progression of the mass as a whole through a transient plastic state, resulting primarily from the reaction, to the solid state.

6. The process of claim 5 wherein the reactants are present in the approximate molecular ratio of 2 $Na_2O$ to 1 $SiO_2$.

7. The process of preparing a solid, alkali subsilicate product which comprises adding molten caustic alkali, containing not more than approximately 15% water, and a solid, sub-divided, silica-containing material selected from the group consisting of silica and alkali metal silicate having a molecular ratio of $SiO_2$ to alkali oxide greater than 1 to 1, to a reaction vessel, the reactants being present in such molecular proportions that the alkali oxide content exceeds the silicon dioxide content and is not greater than approximately 2 to 1, and the caustic alkali containing sufficient sensible heat to cause a reaction between said reactants to form a sub-silicate product without the application of further heat and being at a temperature above approximately 300° C. and the melting point of the caustic alkali employed and below approximately 500° C; reacting the mixture while stirring it; and converting the reaction mass into the solidified alkali sub-silicate product by the progression of the mass as a whole through a transient plastic state, resulting primarily from the reaction, to the solid state.

8. The process of claim 7 wherein a sodium sub-silicate product is formed by the reaction of approximately 100% molten caustic soda, and a solid, sub-divided, silica-containing material selected from the group consisting of silica and a sodium silicate having a molecular ratio of $SiO_2$ to $Na_2O$ greater than 1 to 1, and wherein the reactants are present in the molecular ratio of between approximately 1.5 $Na_2O$ to 1 $SiO_2$ and approximately 2 $Na_2O$ to 1 $SiO_2$.

9. The process of preparing a solid, technically anhydrous alkali sub-silicate product which comprises adding molten caustic alkali, containing not more than approximately 15% water, and a solid, sub-divided, silica-containing material selected from the group consisting of silica and alkali metal silicate having a molecular ratio of $SiO_2$ to alkali oxide greater than 1 to 1, to a reaction vessel, the reactants being present in such molecular proportions that the alkali oxide content exceeds silicon dioxide content and is not greater than approximately 2 to 1, and the caustic alkali containing sufficient sensible heat to cause a reaction between said reactants and to free the mixture substantially of water to form a subsilicate product without the application of further heat and being at a temperature above approximately 300° C. and the melting point of the caustic alkali employed and below approximately 500° C.; reacting the mixture while stirring it;

and converting the reaction mass into the solidified alkali sub-silicate product by the progression of the mass as a whole through a transient plastic state, resulting primarily from the reaction, to the solid state.

10. The process of claim 9 wherein a sodium sub-silicate product is formed by the reaction of approximately 100% molten caustic soda and a solid, sub-divided, silica-containing material selected from the group consisting of silica and a sodium silicate having a molecular ratio of $SiO_2$ to $Na_2O$ greater than 1 to 1, and wherein the reactants are present in the molecular ratio of between approximately 1.5 $Na_2O$ to 1 $SiO_2$ and approximately 2 $Na_2O$ to 1 $SiO_2$.

11. The process of preparing a solid, sodium sub-silicate product which comprises adding molten caustic soda, containing not more than approximately 15% water, and sub-divided silica to a reaction vessel, the reactants being present in such molecular proportions that the $Na_2O$ content exceeds the $SiO_2$ content and is not greater than approximately 2 to 1, and the caustic soda containing sufficient sensible heat to cause a reaction between said reactants to form a sub-silicate product without the application of further heat and being at a temperature above approximately 300° C. and the melting point of the caustic soda employed and below approximately 500° C.; reacting the mixture while stirring it; and continuing the stirring to convert the reaction mass into a granular solidified alkali sub-silicate product by the progression of the mass as a whole through a transient plastic state, resulting primarily from the reaction, to the solid state.

12. The process of preparing a solid, technically anhydrous, sodium silicate product which comprises adding approximately 100% molten caustic soda and sub-divided silica to a reaction vessel, the reactants being present in such molecular proportions that the $Na_2O$ content exceeds the $SiO_2$ content and is not greater than approximately 2 to 1, and the caustic soda containing sufficient sensible heat to cause a reaction between said reactants and to free the mixture substantially of water to form a sub-silicate product without the application of further heat and being at a temperature above the melting point of the caustic soda employed and below approximately 500° C.; reacting the mixture while stirring it; and continuing the stirring to convert the reaction mass into a granular solidified sodium sub-silicate product by the progression of the mass as a whole through a transient plastic state, resulting primarily from the reaction, to the solid state.

13. The process of claim 5 wherein the reactants are present in the approximate molecular ratio of 1.5 $Na_2O$ to 1 $SiO_2$.

14. The process of claim 5 wherein the reactants are present in the approximate molecular ratio of 2 $Na_2O$ to 1 $SiO_2$.

15. The process of preparing a solid, sodium sub-silicate product which comprises adding molten caustic soda, containing not more than approximately 15% water, and solid, sub-divided, sodium silicate having a molecular ratio of $SiO_2$ to $Na_2O$ greater than 1 to 1, to a reaction vessel, the reactants being present in such molecular proportions that the $Na_2O$ content exceeds the $SiO_2$ content and is not greater than approximately 2 to 1, and the caustic soda containing sufficient sensible heat to cause a reaction between said reactants to form a sub-silicate product without the application of further heat and being at a temperature above approximately 300° C. and the melting point of the caustic soda employed and below approximately 500° C.; reacting the mixture while stirring it; and continuing the stirring to convert the reaction mass into a granular solidified sodium subsilicate product by the progression of the mass as a whole through a transient plastic state, resulting primarily from the reaction, to the solid state.

16. The process of preparing a solid, technically anhydrous sodium silicate product which comprises adding approximately 100% molten caustic soda and solid, sub-divided, sodium silicate having a molecular ratio of $SiO_2$ to $Na_2O$ greater than 1 to 1, to a reaction vessel, the reactants being present in such molecular proportions that the $Na_2O$ content exceeds the $SiO_2$ content and is not greater than approximately 2 to 1, and the caustic soda containing sufficient sensible heat to cause a reaction between said reactants and to free the mixture substantially of water to form a sub-silicate product without the application of further heat and being at a temperature above the melting point of the caustic soda employed and below approximately 500° C.; reacting the mixture while stirring it; and continuing the stirring to convert the reaction mass into a granular solidified sodium subsilicate product by the progression of the mass as a whole through a transient plastic state, resulting primarily from the reaction, to the solid state.

17. The process of claim 16 wherein a technically anhydrous, sodium sesquisilicate is formed by having the reactants present in the approximately molecular ratio of 1.5 $Na_2O$ to 1 $SiO_2$.

18. The process of claim 16 wherein a technically anhydrous, sodium orthosilicate is formed by having the reactants present in the approximate molecular ratio of 2 $Na_2O$ to 1 $SiO_2$.

19. The process of preparing a solid sodium sub-silicate product which comprises adding molten caustic soda, containing not more than approximately 15% water, and a solid, sub-divided, silica-containing material selected from the group consisting of silica and sodium silicate having a molecular ratio of $SiO_2$ to $Na_2O$ greater than 1 to 1, to a reaction vessel, the reactants being present in such molecular proportions that the $Na_2O$ content exceeds the $SiO_2$ content and is not greater than approximately 2 to 1; reacting the mixture while stirring it in the presence of a compound selected from the group of: a sodium carbonate, a sodium phosphate, at a temperature above approximately 300° C. and the melting point of the caustic soda employed and below approximately 500° C.; and continuing the stirring to convert the reaction mass into a granular solidified sodium silicate product by the progression of the mass as a whole through a transient plastic state, resulting primarily from the reaction, to the solid state.

20. The process of preparing a solid sodium sub-silicate product which comprises adding molten caustic soda, containing not more than approximately 15% water, and a solid, sub-divided, silica-containing material selected from the group consisting of silica and sodium silicate having a molecular ratio of $SiO_2$ to $Na_2O$ greater than 1 to 1, and a material selected from the group consisting of: a sodium carbonate, a sodium phosphate, to a reaction vessel, the caustic soda and silica-containing material being present in molecular proportions to form a sub-silicate having a molecular ratio of $Na_2O$ to $SiO_2$ in excess of 1 to 1 and not greater than approximately 2 to 1, and the caustic soda containing sufficient sensible heat to cause a reaction between the caustic soda and the silica-containing material to form a sub-silicate product without the application of further heat but being at a temperature above approximately 300° C. and the melting point of the caustic soda employed and below approximately 500° C.; reacting the mixture while stirring it; and continuing the stirring to convert the reaction mass into a granular solidified sodium subsilicate product by the progression of the mass as a whole through a transient plastic state, resulting primarily from the reaction, to the solid state.

21. The process of claim 5 wherein the reactants are present in the approximate molecular ratio of 1.5 $Na_2O$ to 1 $SiO_2$.

RICHARD LLOYD DAVIES.

REFERENCES CITED

The following references are of record in the file of this patent:

Bloxam, Journal of the Chemical Society, London, pages 143–53 (1861).

Jordis, Zeitschrift fur anorganische Allgem. Chemie, vol. 56, pages 296–319 (1908).

Jordis, Zeitschrift fur anorganische Allgem. Chemie, vol. 58, pages 98–101 (1908).

Morey, Journal of the American Chemical Society, vol. 39, pages 1193–4 (1917).

D'Ans et al., Berichte der deutschen chemischen Gesellschaft, vol. 63B, pages 1446–55 (1930).

Gmelin, Handbuch der anorganische Chemie, 8th ed., vol. 21, pages 861, 862, and 871.